June 25, 1963
A. P. SMITH, SR., ET AL
3,094,939
LIQUID SPRAYING PUMP
Original Filed June 18, 1959
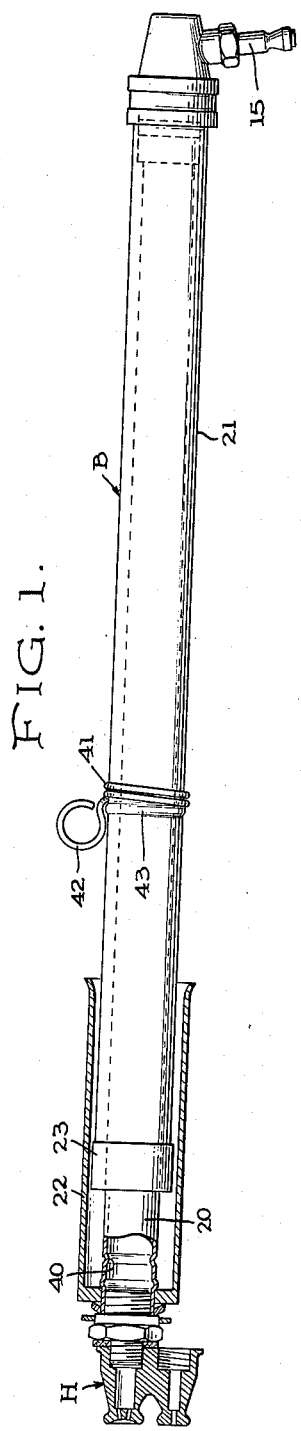
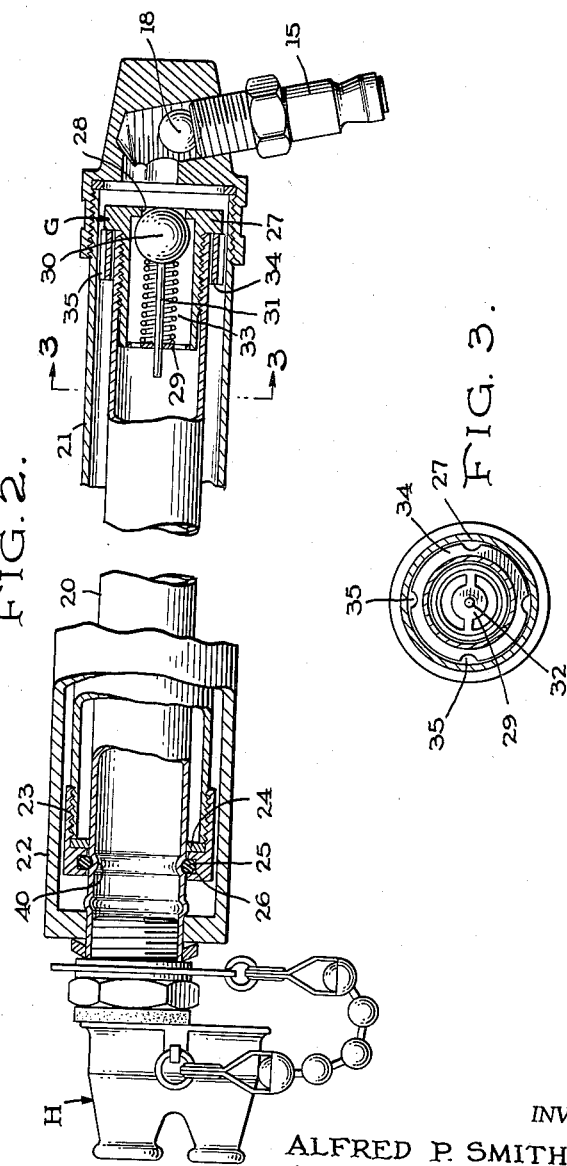
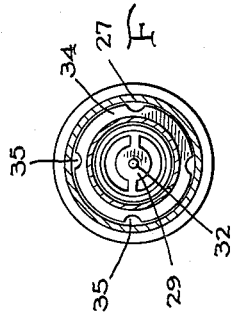
INVENTORS
ALFRED P. SMITH, SR.
ALFRED P. SMITH, JR.
WILLIAM T. JONES
BY *Emery L. Groff*
ATTORNEY

United States Patent Office 3,094,939
Patented June 25, 1963

3,094,939
LIQUID SPRAYING PUMP
Alfred P. Smith, Sr., Alfred P. Smith, Jr., and William T. Jones, Utica, N.Y., assignors to D. B. Smith & Company, Inc., Utica, N.Y., a corporation of New York
Original application June 18, 1959, Ser. No. 821,213. Divided and this application Dec. 13, 1960, Ser. No. 75,520
4 Claims. (Cl. 103—188)

This invention relates to a liquid spraying pump known as a trombone type, which is particularly adaptable for use with a back-pack tank shown and described in our co-pending application Serial No. 821,213, filed June 18, 1959, of which this application is a division.

One of the objects of the invention is to provide means for locking the inner and outer cylinders of the pump in closed or maximum telescoped position to prevent their unintentional separation when the pump is not in use.

Another object is to provide an improved valve assembly at the inlet end of the pump which is economical to manufacture and is positive acting under varying conditions of use.

Another object of the invention is to provide an improved type of packing so as to insure proper functioning of the pump even though it may have been unused for a long period of time.

With the above and other objects in view which will appear as the nature of the invention is better understood, the invention consists in the novel construction, combination, and arrangement of parts, hereinafter more fully described, illustrated and claimed.

A preferred and practical embodiment of the invention is shown in the accompanying drawings, in which:

FIGURE 1 is an elevational view of the pump partly in section, with the inner and outer cylinders partially separated.

FIGURE 2 is an elevational view partly in section showing the means for locking the inner and outer cylinders in their inoperative or maximum telescoped position so as to prevent accidental displacement, and also showing the valve means at the inlet end of the pump.

FIGURE 3 is a sectional view taken on the line 3—3 of FIGURE 2.

The pump B comprises generally an inner cylinder 20 slidably arranged within an outer cylinder 21, and a telescoping type handle 22 secured at the discharge end of the inner cylinder.

The outer cylinder 21 has threaded thereon at its inlet end, a male member 15 of the well known quick-disconnect fitting type. At the opposite end of cylinder 21, a packing gland nut 23 is threadedly engaged thereon, and includes a gasket 24 seated in an axially directed annular groove 24a, and an O ring member seated within but projecting slightly beyond an axially directed annular groove 26. This O ring projection fits snugly into an outwardly directed annular groove 40 formed near the discharge end of the inner tube 20. The member 25 may be made of rubber, plastic, or other resilient material. The O ring, in place, is of lesser minimum or inside diameter than the normal ungrooved outside diameter of the inner cylinder 20, and provides with gasket 24 an absolute tight seal between the inner and outer cylinders even with 400 or 500 pounds of pressure, and replace the graphite packing commonly used.

The inlet end of the inner cylinder 20 is internally threaded and is provided with a check valve assembly G comprising an externally threaded headed casing 27, an orifice 28 in the outer end thereof and a stop or guide member 29 secured across its inner end. Within the casing 27 there is contained a ball 30 having one end of a stem 31 secured thereto. The opposite end of the stem 31 passes through an opening 32 in the guide member 29. A spring 33 surrounding stem 31 bears against ball 30 at one end and against guide 29 at the other end, thus exerting sufficient pressure on ball 30 to normally maintain it in seated position in orifice 28.

Pressure of incoming fluid against ball 30 caused by reciprocation of the pump will overcome the tension of spring 33, unseat ball 30 and permit fluid to pass through inner cylinder 20. Ball 30 will automatically be re-seated over orifice 28 by spring 33 when reciprocation of the pump is stopped. Secured to the outside of the valve assembly casing 27 is a nut of metal or other solid non-porous material. The nut has a plurality of axially arranged channels 35 formed in its outer surface and is in substantially close fit with the inner wall of outer cylinder 21 and replaces the leather or felt packing frequently used. The latter are undesirable from the standpoint that they have a tendency to dry out over a period of time and thus cause faulty operation or possible failure of the pump. Use of the nut 34 assures that the pump of this invention is always ready for dependable action, even though it has been in storage for a long period of time.

With the foregoing arrangement of parts, movement of the inner cylinder 20 by handle 22 outwardly or to the left in FIGURES 1 and 2 creates a suction which causes first air and then liquid to enter through the fitting 15 and channels 35 into the space between outer cylinder 21 and inner cylinder 20. The return or rightward or inward stroke of the cylinder 20 causes compression of the air and fluid resulting in the seating of ball 18 and the opening of check valve G to permit liquid to flow through cylinder 20 and out through nozzle H. Continuous reciprocation of cylinder 20 provides a strong stream of fluid which may be easily directed onto a fire or any object desired to be sprayed.

In order to provide an effective locking means for retaining the inner and outer cylinders in maximum overlapping or closed position relative to each other, the inner cylinder 20 as mentioned above, is provided with an outwardly directed annular groove 40 near its discharge end. When the cylinders are moved into their innermost position shown in FIGURE 2, the O ring 25 which is normally slightly compressed, expands to return to its normal shape and fits snugly into the groove 40. The fit thus obtained between the inner and outer cylinders is tight enough to prevent them from separating from each other by jarring or by gravity, such as would normally occur in slide type pumps when the nozzle end of the pump is pointed downwardly and is not held in some manner. All that is necessary to release the cylinders from their locked relationship as shown in FIGURE 2 is a slight outward or leftward movement on the handle 22. Locking of the two members is thus efficiently effected without the necessity of any external accessories or fixtures, which are undesirable from the standpoint of cost and inconvenience.

As previously mentioned, the pump of our invention is intended for use with a back-pack type of tank, which is carried on the back of the operator by means of shoulder straps. Such tanks frequently have a clamp type bracket secured thereto for receiving the pump when it is not in use. At times, however, it is desirable to have the pump carried across the operator's chest where it is available for immediate use. In order to provide such an arrangement, a coiled spring 41, one end of which is bent outwardly and formed into a loop 42, is slipped over the outer cylinder 21 and locked in a fixed position by snapping loop 42 over a bead 43 formed in the outer cylinder 21. The loop 42 may be attached to a conventional snap fastener secured to one of the aforesaid shoulder straps and thus be retained in the desired position.

We claim:

1. In a trombone type fluid pressure pump comprising, an outer cylinder, an inner cylinder slidably and telescopically disposed within said outer cylinder, a nozzle at the outlet end of said inner cylinder, a hollow handle secured to said inner cylinder adjacent the outlet end thereof, and inwardly of said nozzle, valve means at the inlet end of said inner cylinder to control the flow of fluid therethrough; the improvement comprising a gland secured to the outer end of said outer cylinder, said gland comprising a nut having a first axially outer and a second axially inner spaced annular groove in its inner wall, a resilient member of circular cross section securely seated in said first groove and extending beyond the depth of the groove, and a packing gasket securely seated in said second groove and contacting the inner cylinder, said resilient member being of lesser interior diameter than the outside diameter of said inner cylinder, said inner cylinder having an outwardly directed annular groove of arcuate cross section near its outlet end for receiving the extension of the resilient packing member when said outer cylinder is in its maximum overlapping position, to thereby provide a packing structure operable uniformly for all positions of the inner and outer cylinders and a frictional lock between the cylinders when in their maximum telescoping position to thus prevent unintentional separation thereof.

2. A trombone type fluid pressure pump, comprising, an outer cylinder, an inner cylinder slidably and telescopically disposed within said outer cylinder, a nozzle at the outlet end of said inner cylinder, valve means at the inlet end of said inner cylinder, gland means adjacent the end of one of the cylinders with at least one deep annular groove directed towards the other cylinder, a coplanar shallower annular groove in the other cylinder facing the first recited groove, a resilient element carried mainly within the deep groove and projecting beyond the groove sufficiently to make resilient contact with the coplanar groove, whereby the cylinders are secured against unintentional separation when they are in maximum telescoping position.

3. A pump according to claim 2, wherein, said valve means comprises a headed tubular casing the tube portion of which is externally threaded within the inner cylinder and the head portion of which extends radially beyond the end of the inner cylinder sufficiently to form an annular shoulder thereabout, the casing having a circular central opening in its headed end, a perforated guide member secured at the inner end of said casing and having a centrally located opening therein, a ball within said casing of greater diameter than the casing opening, a stem extending from said ball through the opening in said guide member, an expansion spring surrounding said stem and confined between said guide member and said ball to normally urge said ball into seated position in the opening in the headed end of said casing.

4. A pump according to claim 3, including a solid packing member secured to the outside of the inner cylinder and abutting said annular shoulder, and in substantially close fit with the inner wall of the outer cylinder, said packing member having a plurality of axially disposed arcuate channels in its outer surface.

References Cited in the file of this patent

UNITED STATES PATENTS

| | | |
|---|---|---|
| 497,050 | Guest | May 9, 1893 |
| 817,538 | Wixon | Apr. 10, 1906 |
| 1,416,445 | Burd | May 16, 1922 |
| 1,431,355 | Andrews | Oct. 10, 1922 |
| 1,465,392 | Goodfellow | Aug. 21, 1923 |
| 1,999,655 | Coyle | Apr. 30, 1935 |
| 2,649,335 | Funke | Apr. 18, 1953 |
| 2,683,060 | Wise et al. | July 6, 1953 |
| 2,880,939 | Esmay | Apr. 7, 1959 |
| 3,008,428 | Santarelli | Nov. 14, 1961 |

FOREIGN PATENTS

| | | |
|---|---|---|
| 655,951 | Great Britain | Aug. 8, 1951 |